(12) United States Patent
Romrell et al.

(10) Patent No.: US 11,778,246 B2
(45) Date of Patent: *Oct. 3, 2023

(54) LINEAR ADVERTISING FOR ADAPTIVE BITRATE SPLICING

(71) Applicant: ARRIS Enterprises LLC, Suwanee, GA (US)

(72) Inventors: David A. Romrell, Hillsboro, OR (US); David J. Czeck, Jr., Beaverton, OR (US); Xavier P. Denis, Beaverton, OR (US)

(73) Assignee: ARRIS Enterprises LLC, Suwanee, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/573,424

(22) Filed: Jan. 11, 2022

(65) Prior Publication Data

US 2022/0141506 A1 May 5, 2022

Related U.S. Application Data

(63) Continuation of application No. 16/007,307, filed on Jun. 13, 2018, now Pat. No. 11,252,447.

(Continued)

(51) Int. Cl.
*H04N 21/234* (2011.01)
*H04N 21/2383* (2011.01)
(Continued)

(52) U.S. Cl.
CPC . *H04N 21/23424* (2013.01); *H04N 21/25841* (2013.01); *H04N 21/2668* (2013.01); *H04N 21/26258* (2013.01); *H04N 21/4524* (2013.01); *H04N 21/4532* (2013.01); *H04N 21/812* (2013.01); *H04N 21/8455* (2013.01); *H04N 21/8456* (2013.01); *H04N 21/858* (2013.01)

(58) Field of Classification Search
None
See application file for complete search history.

(56) References Cited

U.S. PATENT DOCUMENTS 8,799,943 B1 * 8/2014 Sherwin ............... H04N 21/845
33/36
9,066,115 B1 6/2015 Cherry et al.
(Continued)

OTHER PUBLICATIONS

PCT International Search Report, RE: Application No. PCT/US2018/037349, dated Aug. 3, 2018.

*Primary Examiner* — Brian T Pendleton
*Assistant Examiner* — Jean D Saint Cyr
(74) *Attorney, Agent, or Firm* — Chernoff, Vilhauer, McClung & Stenzel, LLP

(57) ABSTRACT

Methods, systems, and computer readable media can be operable to facilitate a coordination between QAM and adaptive bitrate content delivery. Location information associated with a device may be utilized to identify and retrieve advertisements or alternate content for placement into a stream that is carrying requested content. Advertisement or alternate content may be placed into a stream based on retrieved placement information. The placement information may be resolved from one format to another depending upon a specific mode of delivery that is selected for delivering the stream to a media device.

15 Claims, 6 Drawing Sheets

Related U.S. Application Data

(60) Provisional application No. 62/518,926, filed on Jun. 13, 2017.

(51) Int. Cl.
    *H04N 21/45*     (2011.01)
    *H04N 21/61*     (2011.01)
    *H04N 21/81*     (2011.01)
    *H04N 21/858*     (2011.01)
    *H04N 21/258*     (2011.01)
    *H04N 21/845*     (2011.01)
    *H04N 21/262*     (2011.01)
    *H04N 21/2668*     (2011.01)

(56) References Cited

U.S. PATENT DOCUMENTS

2014/0244828 A1*   8/2014   Besehanic ............. H04L 67/535
                                                                         709/224
2016/0323606 A1*  11/2016   Mao ................. H04N 21/64707
2018/0131975 A1*   5/2018   Badawiyeh ........ H04N 21/2385

* cited by examiner

LINEAR ADVERTISING FOR ADAPTIVE BITRATE SPLICING

CROSS REFERENCE TO RELATED APPLICATION

This application is a continuation of U.S. patent application Ser. No. 16/007,307 filed on Jun. 13, 2018, which claims the benefit of U.S. Provisional Application Ser. No. 62/518,926, entitled "System for Expanding Traditional Linear Advertising for Adaptive Bitrate Splicing with Dynamic Decisions and Micro-Targeting," which was filed on Jun. 13, 2017, the contents of which are each incorporated herein by reference in their entirety.

TECHNICAL FIELD

This disclosure relates to linear advertising for adaptive bitrate splicing.

BACKGROUND

Traditional linear advertisement sales utilize a T&B system (Traffic and Billing) that generates CCMS (cable computerized management system) files as schedules to fill advertisement spots into each advertisement break window into each network channel that is defined by zones. Today, advertisement back office products consume these advertisement schedules and control XMS video servers and video splicers to generate transport streams that are delivered over QAM (quadrature amplitude modulation) to set top boxes in each region.

This market is being disrupted by ABR (adaptive bitrate) video delivered over IP (Internet protocol) to HTTP streaming clients. In this case, a manifest controller (e.g., manifest delivery controller (MDC)) product can perform dynamic target advertising that makes unique decisions for each streaming client as placement opportunities are discovered. These dynamic decisions have a different workflow from the scheduled linear advertisements described above.

These systems may be merged together to build a single advertising and delivery solution that can support traditional linear delivery over QAM, linear delivery over IP, or both. The ABR and HTTP streaming outputs from a manifest controller may be delivered as a linear channel over QAM. This creates unique challenges for advertising because the T&B systems are not designed to support the ABR workflow for advertisement preparation or for HTTP delivery. Therefore, a need exists for improved methods and systems for identifying advertisement spots, providing tracking for billing purposes, and identifying channels.

BRIEF DESCRIPTION OF THE DRAWINGS

Like reference numbers and designations in the various drawings indicate like elements.

DETAILED DESCRIPTION

It is desirable to improve upon methods and systems for identifying advertisement spots, providing tracking for billing purposes, and identifying channels. Methods, systems, and computer readable media can be operable to facilitate a coordination between QAM and adaptive bitrate content delivery. Location information associated with a device may be utilized to identify and retrieve advertisements or alternate content for placement into a stream that is carrying requested content. Advertisement or alternate content may be placed into a stream based on retrieved placement information. The placement information may be resolved from one format to another depending upon a specific mode of delivery that is selected for delivering the stream to a media device.

Figure 1:
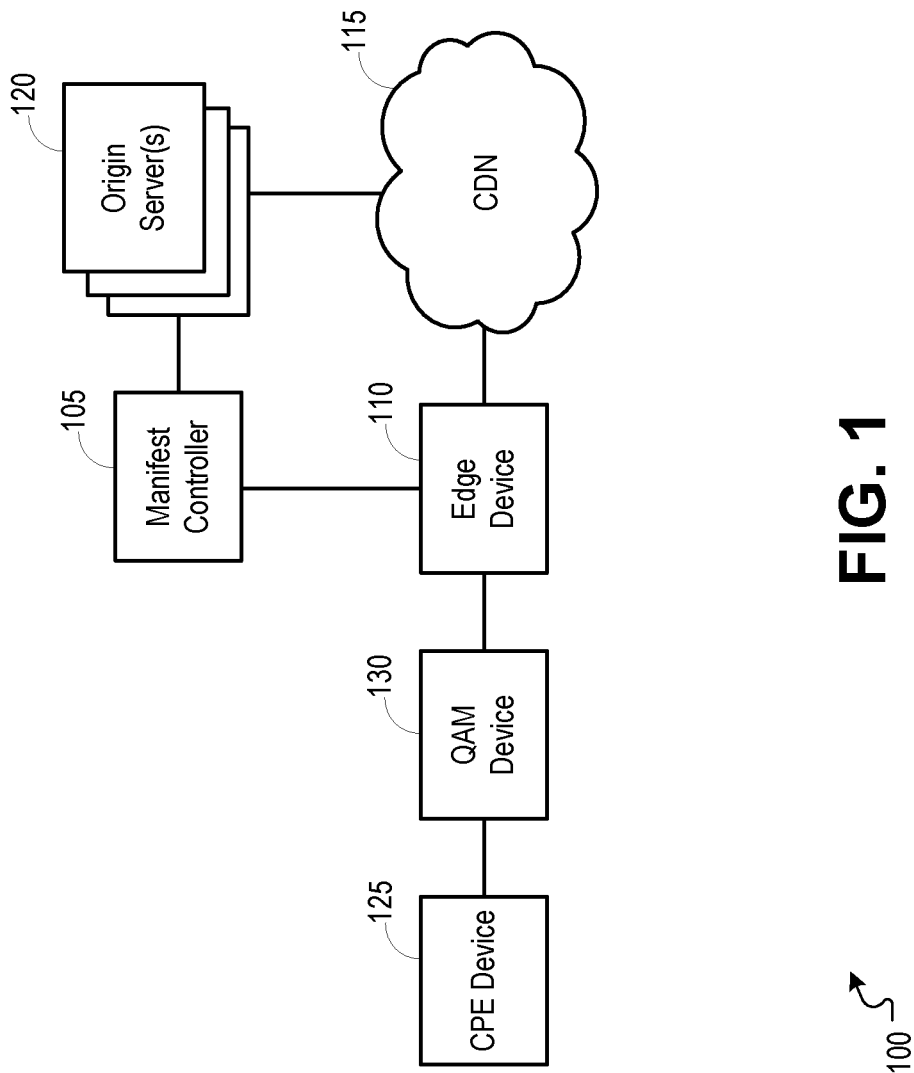
FIG. 1 is a block diagram illustrating an example network environment operable to facilitate a coordination between QAM and adaptive bitrate content delivery.

FIG. 1 is a block diagram illustrating an example network environment 100 operable to facilitate a coordination between QAM and adaptive bitrate content delivery.

In embodiments, an advertisement back office may be integrated into a manifest controller 105 (e.g., MDC (manifest delivery controller)).

In embodiments, the manifest controller 105 and an edge device 110 (e.g., VUE (virtualized universal edge)) may be programmed based on region and profile attributes to setup a video stream for a micro-targeted delivery system.

In embodiments, the manifest controller 105 may retrieve playback information and location information from the edge device 110, and the manifest controller 105 may retrieve a channel manifest and/or an advertisement manifest from a CDN (content delivery network) 115 and/or one or more origin servers 120.

In embodiments, content may be delivered to a CPE (customer premise equipment) device 125 through a QAM (quadrature amplitude modulation) device 130.

Figure 2:
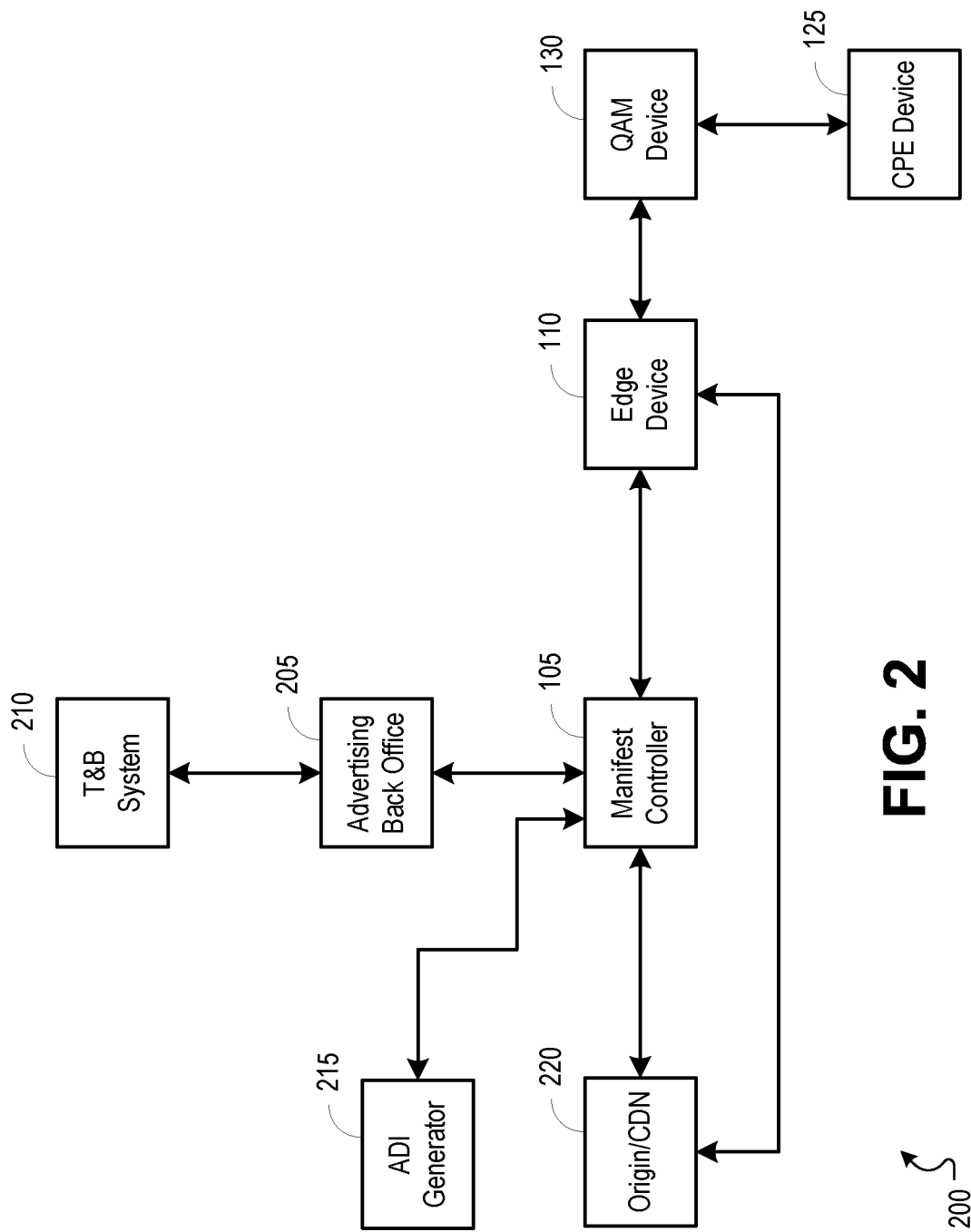
FIG. 2 is a block diagram illustrating an example system operable to facilitate a coordination between QAM and adaptive bitrate content delivery.

FIG. 2 is a block diagram illustrating an example system 200 operable to facilitate a coordination between QAM and adaptive bitrate content delivery.

In embodiments, an advertising back office 205 (e.g., SkyVision, etc.) may be integrated as a component into a manifest controller 105. The advertising back office 205 and manifest controller 105 may coordinate to translate traditional T&B (traffic and billing) based CCMS (cable computerized management system) schedules to a format for adaptive bitrate delivery for HTTP streaming. For example, T&B based CCMS schedules may be retrieved from a T&B system 210. The coordination between the advertising back office 205 and the manifest controller 105 may provide for a combination of multiple regional T&B systems into one system. The advertising back office 205 and manifest controller 105 may coordinate to translate T&B system identifiers (e.g., spot ID, network, zone ID, etc.) into asset identifiers and URLs needed for ABR delivery. For example, T&B system identifiers may be retrieved from a T&B system 210. The manifest controller 105 may distribute and cache the results of these expanded CCMS schedules to each of one or more adaptive bitrate splicer instances, thereby allowing efficient, scalable, and timely resolution of advertisement breaks.

In embodiments, additional tracking information may be retrieved from the QAM device 130, the information including, but not limited to, a count of a number of clients serviced, different tracking types/thresholds, and others. The manifest controller 105 may track verifications for multiple systems (e.g., both the SCTE 130-3 and VAST decision systems) from IP clients or edge device 110 (e.g., virtualized universal edge (VUE)). A SDV (switched delivery video) client management device may provide tune in/out indicators for each channel and the tune in/out indicators may be correlated with advertisement decisions. In embodiments, a CPE device 125 (e.g., STB (set-top box), gateways, etc.) or other delivery systems can count number tune in/out indicators for each channel to correlate with the advertisement breaks and decisions.

Utilizing a micro-targeting capability (e.g., very small service groups defined by Remote-Phy, Fiber-Deep, or SDV), tune in/out information may be continuously recorded along with attributes available for fine grained region or profile information. A reporting system may use this information to forecast and drill into potential regions for targeting and/or to create dynamic ad hoc sub-channels into a region for precise, pin-pointed advertisement targeting. Based on the fine grained regional attribute or profile information, channels may be dynamically configured (or scheduled to be configured). For example, the edge device 110 and the manifest controller 105 may be programmed based on the region and profile attributes to setup the video stream which may be used by micro-targeted delivery systems. The region and profile attributes may be incorporated into T&B based channels and zones to provide for configuration of zone splits. In embodiments, the advertising back office 205 may create rules or overlays of new sub-channels that can be carved into the existing channels or carved across channels to schedule advertisements that may be of higher value to a specific region/profile combination. This may also be combined with the above capability for carving out a subset of the linear schedules for dynamic decisions.

In embodiments, the advertising back office 205 and the manifest controller 105 may coordinate splitting of zones to provide finer targeting by zone. The manifest controller may signal downstream verification for SCTE 130-3 PSN (which may be used by the edge device 110). Event logging may be utilized to capture the SDV tune in/out data and then to build an interface for timely updates to augment the per-channel verifications at the manifest controller and the tune in/out data may be forwarded to a dynamic advertisement back office (e.g., ADS (advertisement decision system)). Viewership data may be provided in response to a VAST ADS (e.g., a beacon with parameter to indicate count or repeated beacons to represent the count of clients).

In embodiments, the manifest controller 105 may provide the interfaces for multiple T&B systems to upload new/updated CCMS schedules.

In embodiments, the manifest controller 105 may integrate ADI (advertisement insertion) information (e.g., information received from an ADI generator 215) with advertisements to provide resolution from spotID to advertisement URLs (uniform resource locator) for corresponding advertisement formats. Resolution from spotID to advertisement URLs may be facilitated through an integration with CIS (content Information system), as rules that translate spot ID to URL strings, or as a file or other lookup mechanism that may provide the mapping.

In embodiments, the manifest controller 105 and the edge device 110 may include channel playback that is defined based on attributes that indicate the zone or provide a lookup for channel identification. These attributes may include a more finely detailed indication of region or demographic profiles.

In embodiments, the manifest controller 105 may receive network feeds with markups indicating advertisement break opportunities (e.g., cues in streaming content to manipulate, such as EXT-X-SIGNAL-START, spot=?). For example, network feeds may be received from an origin/CDN 220. The network, advertisement break markup, advertisement break timing, past decisions during a CCMS window, and other policy rules may be utilized to determine lookup in the schedule for the advertisement spots that may be used. This schedule may include markers (e.g. spot ID of "DELAY") used to indicate a need for dynamic decisions. These determinations may be augmented with target impression counts to track once a required threshold is met to allow increased opportunity by filling the remainder of the avail dynamically.

In embodiments, the manifest controller 105 may support dynamic advertisement decision systems using SCTE-130, VAST, VAST redirects or wrappers, and may support ADS routing rules with retries. The responses of these systems may include attributes to indicate the relative value of an advertisement placement.

In embodiments, decisions may be made on one, either, or across many ADS systems with selector between them to choose which takes precedence (e.g., realtime bidding across both linear and dynamic systems).

In embodiments, the manifest controller 105 may include an HTTP interface (null.ts) that may support verification on a per-stream basis. For a channel, this may be called with extended parameters to indicate number of streams at start, end, and transitions in middle.

In embodiments, the manifest controller 105 may provide an interface with SDV systems (or other client management/monitoring system) that can get signaling for tune in/outs on a channel, and the manifest controller 105 may internally track the signaling of placement status notifications (SCTE 130-3 PSN). A tracking proxy may be supported, wherein the tracking proxy may provide the fan-out to support this to multiple VAST ADS systems that have registered for feedback on the advertisement placements.

In embodiments, the manifest controller 105 may support the tune in/out information as logging events for reports on channels for total viewership at any point in time and across the filled zones, micro-targeting regional/profile attributes, and the advertisement breaks. Utilizing the logging events, targeting with higher value may be forecasted based upon past placements, and algorithmic forecasting may provide rules with automatic targeting based on past usage and prediction.

In embodiments, the manifest controller 105 may be deployed as horizontal satellite instances that can each perform the steps described herein. A particular channel may be targeted at a specific instance (or multiple instances for resiliency). The CCMS schedules (and their internal extensions/augmentations) associated with a particular channel may be cached in those instances handling that channel to provide improved efficiency and response time.

Figure 3:
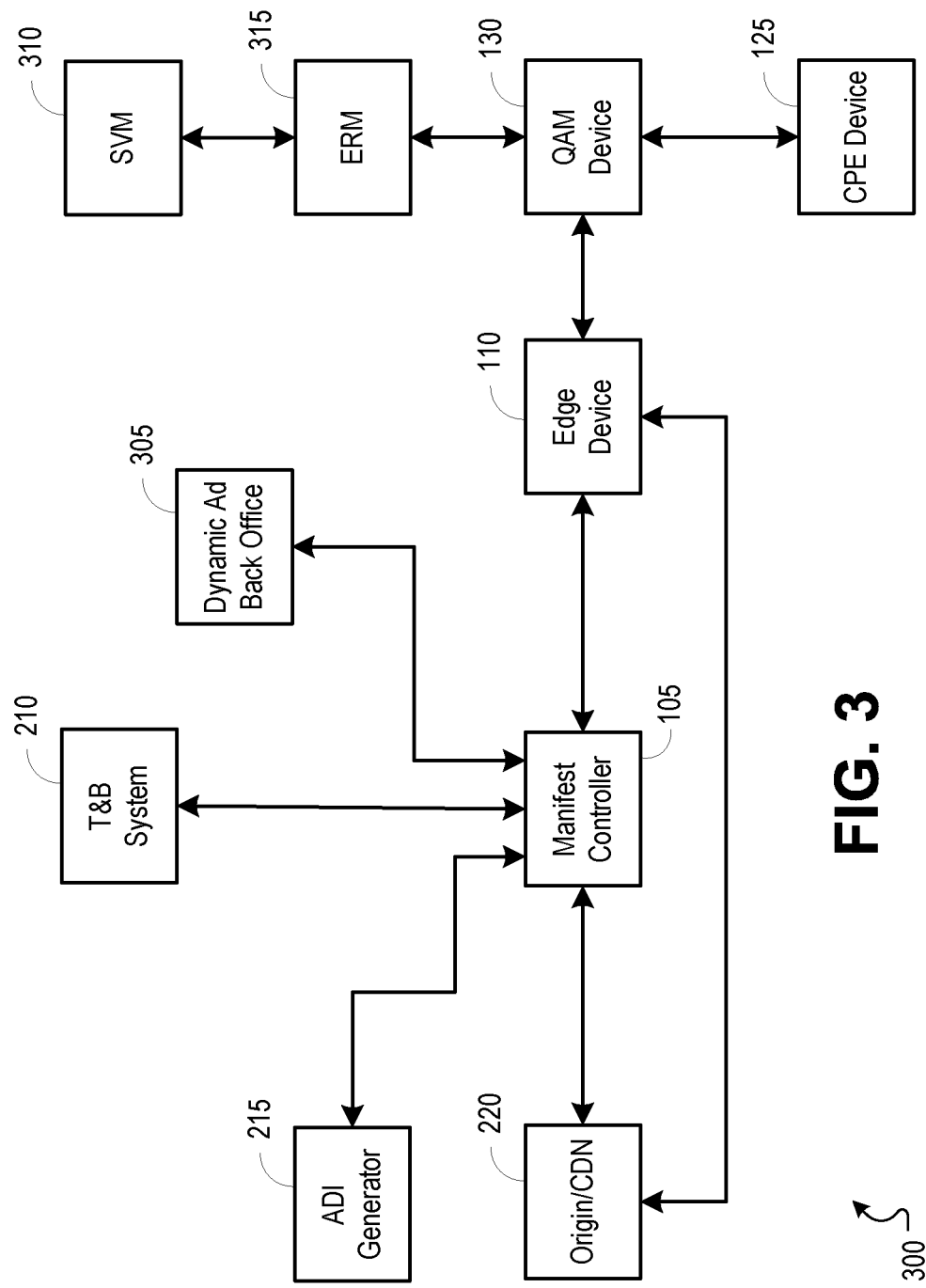
FIG. 3 is a block diagram illustrating an example system operable to facilitate dynamic advertisement insertion.

FIG. 3 is a block diagram illustrating an example system 300 operable to facilitate dynamic advertisement insertion.

In embodiments, a dynamic advertising back office 305 (e.g., SkyVision, etc.) may be integrated as a component into a manifest controller 105. The dynamic advertising back office 305 and manifest controller 105 may coordinate to translate traditional T&B (traffic and billing) based CCMS (cable computerized management system) schedules to a format for adaptive bitrate delivery for HTTP streaming. For example, T&B based CCMS schedules may be retrieved from a T&B system 210. The coordination between the dynamic advertising back office 305 and the manifest controller 105 may provide for a combination of multiple regional T&B systems into one system. The dynamic advertising back office 305 and manifest controller 105 may coordinate to translate T&B system identifiers (e.g., spot ID, network, zone ID, etc.) into asset identifiers and URLs needed for ABR delivery. For example, T&B system identifiers may be retrieved from a T&B system 210. The manifest controller 105 may distribute and cache the results of these expanded CCMS schedules to each of one or more adaptive bitrate splicer instances, thereby allowing efficient, scalable, and timely resolution of advertisement breaks.

In embodiments, special spot markers may be reserved within the T&B system 210 for placement into CCMS schedules, the special spot markers providing an indication of breaks that may be resolved by a dynamic advertisement system (e.g., by the dynamic advertising back office 305). The CCMS schedules may include additional meta-information associated with spots to provide, for example, an indication of market value, target impression counts, or other parameter. Based on these markers and policies, scheduled linear advertisement spots may be serviced and/or replaced by decisions from a dynamic advertisement decision system.

In embodiments, additional tracking information may be retrieved from the QAM device 130, the information including, but not limited to, a count of a number of clients serviced, different tracking types/thresholds, and others. The manifest controller 105 may track verifications for multiple systems (e.g., both the SCTE 130-3 and VAST decision systems) from IP clients or edge device 110 (e.g., virtualized universal edge (VUE)). A SVM (switched video management) device 310 may provide tune in/out indicators for each channel and the tune in/out indicators may be correlated with advertisement decisions. In embodiments, a CPE device 125 (e.g., STB (set-top box), gateways, etc.) or other delivery systems can count number tune in/out indicators for each channel to correlate with the advertisement breaks and decisions. Further information that may be used by a dynamic advertisement system may include viewership and rating information that may be gathered externally. From any of these sources, timely or augmented verification reports may be sent back to a dynamic advertisement decision system as unique streams to each client.

In embodiments, an ERM (edge resource manager) 315 may provide information associated with the resources and capabilities of a QAM device 130.

Utilizing a micro-targeting capability (e.g., very small service groups defined by Remote-Phy, Fiber-Deep, or SDV), tune in/out information may be continuously recorded along with attributes available for fine grained region or profile information. A reporting system may use this information to forecast and drill into potential regions for targeting and/or to create dynamic ad hoc sub-channels into a region for precise, pin-pointed advertisement targeting. Based on the fine grained regional attribute or profile information, channels may be dynamically configured (or scheduled to be configured). For example, the edge device 110 and the manifest controller 105 may be programmed based on the region and profile attributes to setup the video stream which may be used by micro-targeted delivery systems. The region and profile attributes may be incorporated into T&B based channels and zones to provide for configuration of zone splits. In embodiments, the dynamic advertising back office 305 may create rules or overlays of new sub-channels that can be carved into the existing channels or carved across channels to schedule advertisements that may be of higher value to a specific region/profile combination. This may also be combined with the above capability for carving out a subset of the linear schedules for dynamic decisions.

In embodiments, the dynamic advertising back office 305 and the manifest controller 105 may coordinate splitting of zones to provide finer targeting by zone. The manifest controller 105 may signal downstream verification for SCTE 130-3 PSN (which may be used by the edge device 110). Event logging may be utilized to capture the SDV tune in/out data and then to build an interface for timely updates to augment the per-channel verifications at the manifest controller 105 and the tune in/out data may be forwarded to the dynamic advertisement back office 305. Viewership data may be provided in response to a VAST ADS (e.g., a beacon with parameter to indicate count or repeated beacons to represent the count of clients).

In embodiments, the manifest controller 105 may provide the interfaces for multiple T&B systems to upload new/updated CCMS schedules.

In embodiments, the manifest controller 105 may integrate ADI (advertisement insertion) information (e.g., information received from an ADI generator 215) with advertisements to provide resolution from spotID to advertisement URLs for corresponding advertisement formats. Resolution from spotID to advertisement URLs may be facilitated through an integration with CIS (content Information system), as rules that translate spot ID to URL strings, or as a file or other lookup mechanism that may provide the mapping.

In embodiments, the manifest controller 105 and the edge device 110 may include channel playback that is defined based on attributes that indicate the zone or provide a lookup for channel identification. These attributes may include a more finely detailed indication of region or demographic profiles.

In embodiments, the manifest controller 105 may receive network feeds with markups indicating advertisement break opportunities. For example, network feeds may be received from an origin/CDN 220. The network, advertisement break markup, advertisement break timing, past decisions during a CCMS window, and other policy rules may be utilized to determine lookup in the schedule for the advertisement spots that may be used. This schedule may include markers (e.g. spot ID of "DELAY") used to indicate a need for dynamic decisions. These determinations may be augmented with target impression counts to track once a required threshold is met to allow increased opportunity by filling the remainder of the avail dynamically.

In embodiments, the manifest controller 105 may support dynamic advertisement decision systems using SCTE-130, VAST, VAST redirects or wrappers, and may support ADS routing rules with retries. The responses of these systems may include attributes to indicate the relative value of an advertisement placement.

In embodiments, decisions may be made on one, either, or across many ADS systems with selector between them to choose which takes precedence (e.g., realtime bidding across both linear and dynamic systems).

In embodiments, the manifest controller 105 may include an HTTP interface (null.ts) that may support verification on a per-stream basis. For a channel, this may be called with extended parameters to indicate number of streams at start, end, and transitions in middle.

In embodiments, the manifest controller 105 may provide an interface with SDV systems (or other client management/monitoring system) that can get signaling for tune in/outs on a channel, and the manifest controller 105 may internally track the signaling of placement status notifications (SCTE 130-3 PSN). A tracking proxy may be supported, wherein the tracking proxy may provide the fan-out to support this to multiple VAST ADS systems that have registered for feedback on the advertisement placements.

In embodiments, the manifest controller 105 may support the tune in/out information as logging events for reports on channels for total viewership at any point in time and across the filled zones, micro-targeting regional/profile attributes, and the advertisement breaks. Utilizing the logging events, targeting with higher value may be forecasted based upon past placements, and algorithmic forecasting may provide rules with automatic targeting based on past usage and prediction.

In embodiments, the manifest controller 105 may be deployed as horizontal satellite instances that can each perform the steps described herein. A particular channel may be targeted at a specific instance (or multiple instances for resiliency). The CCMS schedules (and their internal extensions/augmentations) associated with a particular channel may be cached in those instances handling that channel to provide improved efficiency and response time.

Figure 4:
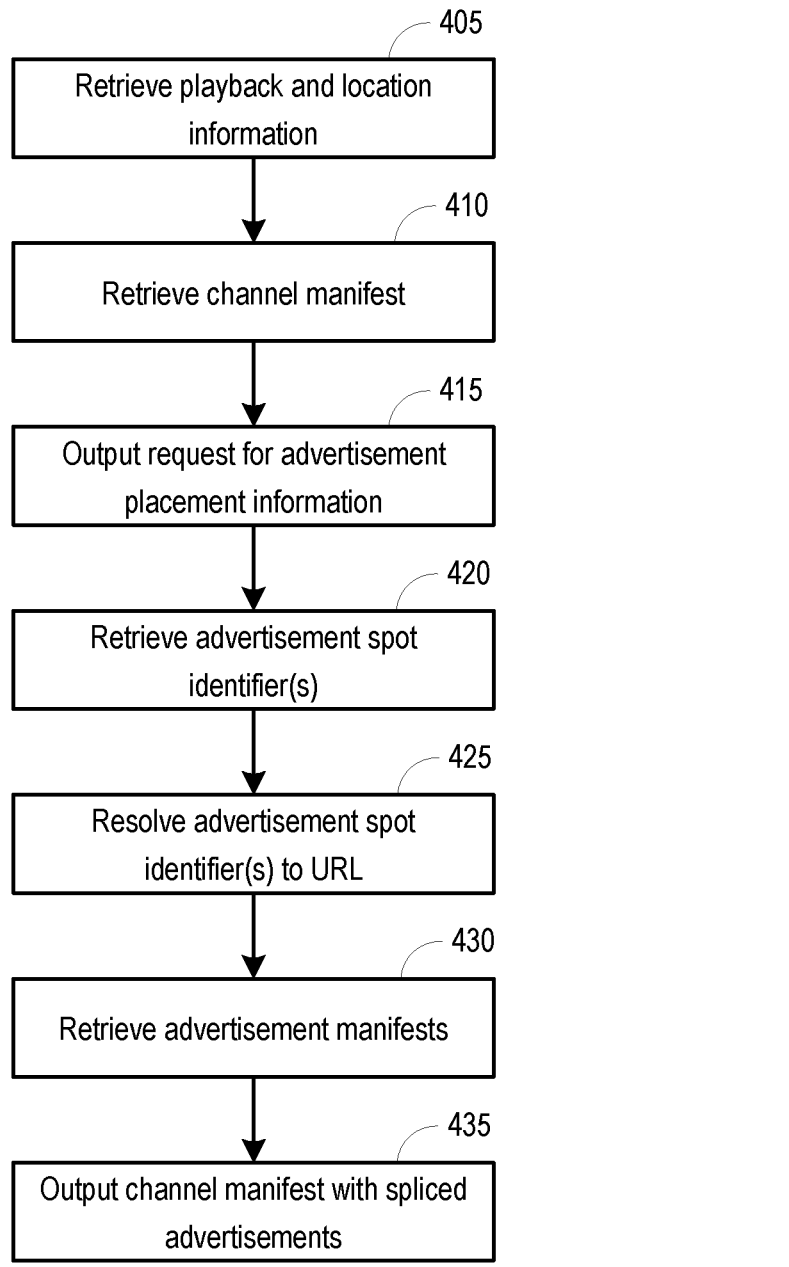
FIG. 4 is a flowchart illustrating an example process operable to facilitate a coordination between QAM and adaptive bitrate content delivery.

FIG. 4 is a flowchart illustrating an example process 400 operable to facilitate a coordination between QAM and adaptive bitrate content delivery. The process 400 may start at 405 when playback and location information is retrieved. Playback and location information may be retrieved, for example, by a manifest controller 105 of FIG. 1. In embodiments, the manifest controller 105 may retrieve playback and location information from an edge device 110 of FIG. 1. Playback information may include a content and/or source identifier (e.g., playback URL). Location information may include a network identifier, a zone identifier, region attributes, and/or profile attributes.

At 410, a channel manifest may be retrieved. The channel manifest may be retrieved, for example, by the manifest controller 105. The manifest controller 105 may retrieve the channel manifest from an origin server (e.g., origin server 120 of FIG. 1) or CDN (e.g., CDN 115 of FIG. 1). In embodiments, the channel manifest may include one or more break markers. For example, the one or more break markers may include Society of Cable Telecommunications Engineers (SCTE) 35 standard based cue tracks.

At 415, a request for advertisement placement information may be output. The request for advertisement placement information may be output, for example, by the manifest controller 105. The manifest controller 105 may output the request for advertisement placement information to an ADS (e.g., to an advertising back office 205 of FIG. 2). In embodiments, the request for advertisement placement information may include identifications of placement opportunities (e.g., one or more break marker locations retrieved at 410) and location information (e.g., location information retrieved at 405).

At 420, one or more advertisement spot identifiers may be retrieved. The one or more advertisement spot identifiers may be retrieved, for example, by the manifest controller 105. The manifest controller 105 may retrieve the one or more advertisement spot identifiers from an ADS (e.g., from an advertising back office 205). In embodiments, the ADS may output the one or more advertisement spot identifiers in response to receiving the request for advertisement placement information.

At 425, the one or more advertisement spot identifiers may be resolved to URL. The one or more advertisement spot identifiers may be resolved to URL, for example, by the manifest controller 105. In embodiments, the manifest controller 105 may translate T&B system identifiers (e.g., spot ID, network, zone ID, etc.) into asset identifiers and URLs needed for ABR delivery. It should be understood that the advertisement placement information (e.g., the one or more advertisement spot identifiers) may be resolved to a format associated with a path for delivering the content to the requesting device.

At 430, advertisement manifests may be retrieved. Advertisement manifests may be retrieved, for example, by the manifest controller 105. The manifest controller 105 may retrieve the advertisement manifests from an origin server (e.g., origin server 120) or CDN (e.g., CDN 115). The advertisement manifest may be retrieved based upon location information associated with the requesting device. The advertisement manifest may be retrieved based upon tune in/out information.

At 435, a channel manifest with spliced advertisements may be output. The channel manifest with spliced advertisements may be output, for example, by the manifest controller 105. The manifest controller 105 may generate and output the channel manifest with spliced advertisements to an edge device (e.g., edge device 110 of FIG. 1). Utilizing the channel manifest with spliced advertisements, the edge device may retrieve media segments (e.g., HLS media segments) and may deliver corresponding media to a CPE device 125 of FIG. 1. For example, the media segments may be retrieved form an origin server (e.g., origin server 120) or CDN (e.g., CDN 115), and the media may be delivered to the CPE device 125 via a QAM device 130 of FIG. 1.

Figure 5:
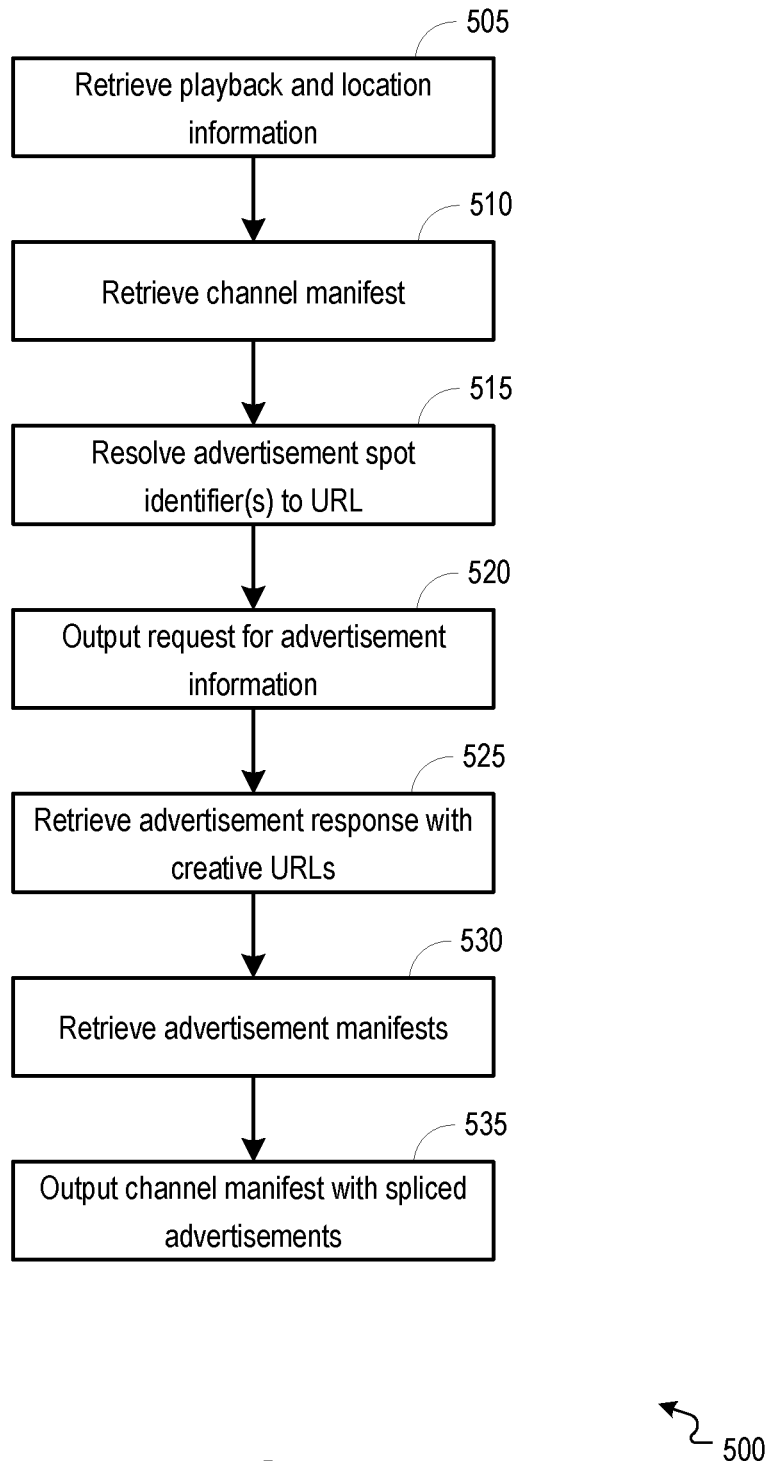
FIG. 5 is a flowchart illustrating an example process operable to facilitate dynamic advertisement insertion.

FIG. 5 is a flowchart illustrating an example process 500 operable to facilitate dynamic advertisement insertion. The process 500 may start at 505 when playback and location information is retrieved. Playback and location information may be retrieved, for example, by a manifest controller 105 of FIG. 1. In embodiments, the manifest controller 105 may retrieve playback and location information from an edge device 110 of FIG. 1. Playback information may include a content and/or source identifier (e.g., playback URL). Location information may include a network identifier, a zone identifier, region attributes, and/or profile attributes.

At 510, a channel manifest may be retrieved. The channel manifest may be retrieved, for example, by the manifest controller 105. The manifest controller 105 may retrieve the channel manifest from an origin server (e.g., origin server 120 of FIG. 1) or CDN (e.g., CDN 115 of FIG. 1). In embodiments, the channel manifest may include one or more break markers. For example, the one or more break markers may include Society of Cable Telecommunications Engineers (SCTE) 35 standard based cue tracks.

At 515, one or more advertisement spot identifiers may be resolved to URL. The one or more advertisement spot identifiers may be resolved to URL, for example, by the manifest controller 105. In embodiments, the manifest controller 105 may translate T&B system identifiers (e.g., spot ID, network, zone ID, etc.) into asset identifiers and URLs needed for ABR delivery.

At 520, a request for advertisement placement information may be output. The request for advertisement placement information may be output, for example, by the manifest controller 105. The manifest controller 105 may output the request for advertisement placement information to an ADS (e.g., to a dynamic advertising back office 305 of FIG. 3). In embodiments, the request for advertisement placement information may include identifications of placement opportunities (e.g., one or more break marker locations), location information (e.g., location information retrieved at 405), and/or STB count information (e.g., tune data received from a CPE device and/or SVM). The request for advertisement placement information may include a request for advertisement placement information for each position within the channel manifest that is marked with a tag indicating a dynamic advertisement decision (e.g., "DELAY" tag, etc.).

At 525, an advertisement response may be retrieved. The advertisement response may be retrieved, for example, by the manifest controller 105. The manifest controller 105 may retrieve the advertisement response from an ADS (e.g., from a dynamic advertising back office 305). In embodiments, the ADS may output the advertisement response in response to receiving the request for advertisement placement information. The advertisement response may include creative URLs for each advertisement placement opportunity, and the creative URLs may be associated with an advertisement or alternate content that is selected for each respective advertisement placement opportunity.

At 530, advertisement manifests may be retrieved. Advertisement manifests may be retrieved, for example, by the manifest controller 105. The manifest controller 105 may retrieve the advertisement manifests from an origin server (e.g., origin server 120) or CDN (e.g., CDN 115). The advertisement manifest may be retrieved based upon location information associated with the requesting device. The advertisement manifest may be retrieved based upon tune in/out information.

At 535, a channel manifest with spliced advertisements may be output. The channel manifest with spliced advertisements may be output, for example, by the manifest controller 105. The manifest controller 105 may output the channel manifest with spliced advertisements to an edge device (e.g., edge device 110 of FIG. 1). Utilizing the channel manifest with spliced advertisements, the edge device may retrieve media segments (e.g., HLS media segments) and may deliver corresponding media to a CPE device 125 of FIG. 1. For example, the media segments may be retrieved form an origin server (e.g., origin server 120) or CDN (e.g., CDN 115), and the media may be delivered to the CPE device 125 via a QAM device 130 of FIG. 1.

Figure 6:
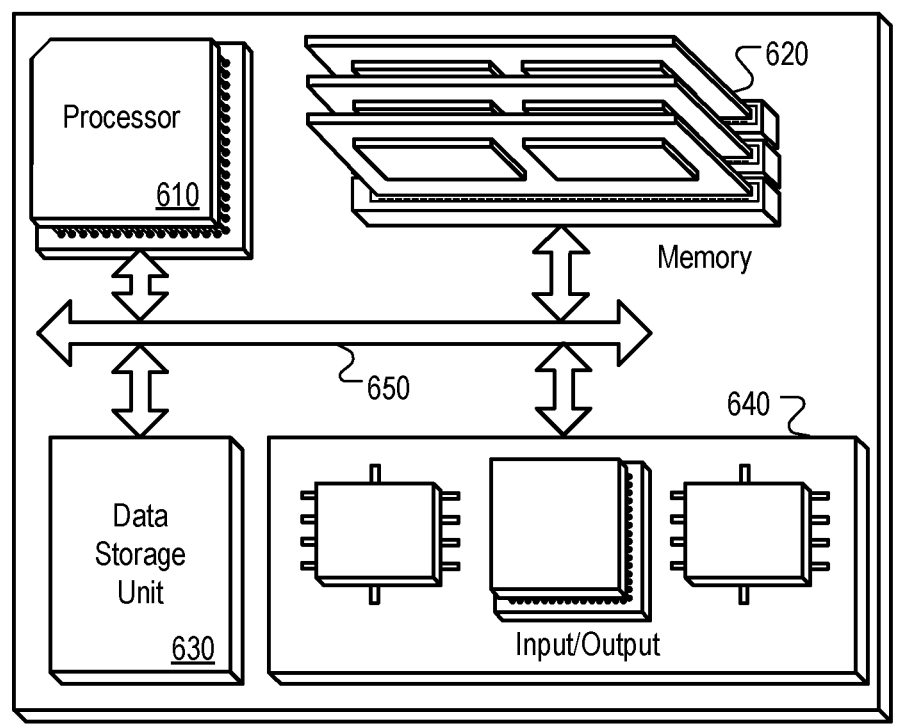
FIG. 6 is a block diagram of a hardware configuration operable to facilitate a coordination between QAM and adaptive bitrate content delivery.

FIG. 6 is a block diagram of a hardware configuration 600 operable to facilitate a coordination between QAM and adaptive bitrate content delivery. The hardware configuration 600 can include a processor 610, a memory 620, a storage device 630, and an input/output device 640. Each of the components 610, 620, 630, and 640 can, for example, be interconnected using a system bus 650. The processor 610 can be capable of processing instructions for execution within the hardware configuration 600. In one implementation, the processor 610 can be a single-threaded processor. In another implementation, the processor 610 can be a multi-threaded processor. The processor 610 can be capable of processing instructions stored in the memory 620 or on the storage device 630.

The memory 620 can store information within the hardware configuration 600. In one implementation, the memory 620 can be a computer-readable medium. In one implementation, the memory 620 can be a volatile memory unit. In another implementation, the memory 620 can be a non-volatile memory unit.

In some implementations, the storage device 630 can be capable of providing mass storage for the hardware configuration 600. In one implementation, the storage device 630 can be a computer-readable medium. In various different implementations, the storage device 630 can, for example, include a hard disk device, an optical disk device, flash memory or some other large capacity storage device. In other implementations, the storage device 630 can be a device external to the hardware configuration 600.

The input/output device 640 provides input/output operations for the hardware configuration 600. In embodiments, the input/output device 640 can include one or more of a network interface device (e.g., an Ethernet card), a serial communication device (e.g., an RS-232 port), one or more universal serial bus (USB) interfaces (e.g., a USB 2.0 port), one or more wireless interface devices (e.g., an 802.11 card), and/or one or more interfaces for outputting video and/or data services to an edge device 110 of FIG. 1, QAM device 130 of FIG. 1, and/or CPE device 125 of FIG. 1. In embodiments, the input/output device can include driver devices configured to send communications to, and receive communications from an ADS (e.g., advertising back office 205 of FIG. 2, dynamic advertising back office 305 of FIG. 3, etc.), an ADI generator 215 of FIG. 2, an origin server 120 of FIG. 1, and/or a CDN 115 of FIG. 1.

Those skilled in the art will appreciate that the invention improves upon methods and systems for identifying advertisement spots, providing tracking for billing purposes, and identifying channels. Methods, systems, and computer readable media can be operable to facilitate a coordination between QAM and adaptive bitrate content delivery. Location information associated with a device may be utilized to identify and retrieve advertisements or alternate content for placement into a stream that is carrying requested content. Advertisement or alternate content may be placed into a stream based on retrieved placement information. The placement information may be resolved from one format to another depending upon a specific mode of delivery that is selected for delivering the stream to a media device.

The methods, systems, and apparatuses described in this disclosure enable the identification and retrieval of one or more preferred or requested media renditions of multimedia content. A subscriber device can maintain a list of media attributes preferred by the subscriber device and/or one or more users with access to the subscriber device, wherein the list includes preferred media attributes in order from the most requested/received attribute to the least requested/received attribute. When the subscriber device receives a request for multimedia content, the subscriber device can identify one or more media attributes preferred by the subscriber, and media renditions of the multimedia content in each of the identified attributes can be downloaded to the subscriber device.

The subject matter of this disclosure, and components thereof, can be realized by instructions that upon execution cause one or more processing devices to carry out the processes and functions described above. Such instructions can, for example, comprise interpreted instructions, such as script instructions, e.g., JavaScript or ECMAScript instructions, or executable code, or other instructions stored in a computer readable medium.

Implementations of the subject matter and the functional operations described in this specification can be provided in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification are performed by one or more programmable processors executing one or more computer programs to perform functions by operating on input data and generating output thereby tying the process to a particular machine (e.g., a machine programmed to perform the processes described herein). The processes and logic flows can also be performed by, and apparatus can also be implemented as, special purpose logic circuitry, e.g., an FPGA (field programmable gate array) or an ASIC (application specific integrated circuit).

Computer readable media suitable for storing computer program instructions and data include all forms of non-volatile memory, media and memory devices, including by way of example semiconductor memory devices (e.g., EPROM, EEPROM, and flash memory devices); magnetic disks (e.g., internal hard disks or removable disks); magneto optical disks; and CD ROM and DVD ROM disks. The processor and the memory can be supplemented by, or incorporated in, special purpose logic circuitry.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results, unless expressly noted otherwise. As one example, the processes depicted in the accompanying figures do not necessarily require the particular order shown, or sequential order, to achieve desirable results. In some implementations, multitasking and parallel processing may be advantageous.

What is claimed is:

1. A method, comprising:
retrieving playback information and location information associated with a device requesting content, wherein the playback information and location information is retrieved by a manifest controller from an edge device that provides content, through a QAM device, to the device requesting content;
retrieving a channel manifest associated with the content;
retrieving advertisement placement information;
resolving the advertisement placement information to a format associated with a path for delivering the content to the device;
retrieving an advertisement manifest;
generating a channel manifest with spliced advertisements; and
outputting the channel manifest with spliced advertisements to the device.

2. The method of claim 1, wherein the advertisement placement information comprises one or more advertisement spot identifiers, and wherein the one or more advertisement spot identifiers are resolved to URL.

3. The method of claim 1, wherein the location information associated with the device comprises a network identifier, a zone identifier, region attributes, or profile attributes.

4. The method of claim 1, wherein the advertisement manifest is selected and retrieved based upon the location information associated with the device.

5. The method of claim 1, wherein the advertisement manifest is selected and retrieved based upon tune in/out information.

6. A system, comprising a manifest controller that:
retrieves playback information and location information associated with a device requesting content, wherein the playback information and location information is retrieved by a manifest controller from an edge device that provides content, through a QAM device, to the device requesting content;
retrieves a channel manifest associated with the content;
retrieves advertisement placement information;
resolves the advertisement placement information to a format associated with a path for delivering the content to the device;
retrieves an advertisement manifest;
generates a channel manifest with spliced advertisements; and
outputs the channel manifest with spliced advertisements to the device.

7. The system of claim 6, wherein the advertisement placement information comprises one or more advertisement spot identifiers, and wherein the one or more advertisement spot identifiers are resolved to URL.

8. The system of claim 6, wherein the location information associated with the device comprises a network identifier, a zone identifier, region attributes, or profile attributes.

9. The system of claim 6, wherein the advertisement manifest is selected and retrieved based upon the location information associated with the device.

10. The system of claim 6, wherein the advertisement manifest is selected and retrieved based upon tune in/out information.

11. A method, comprising:
retrieving playback information and location information associated with a device requesting content;
retrieving a channel manifest associated with the content;
retrieving advertisement placement information;
resolving the advertisement placement information to a format associated with a path for delivering the content to the device, wherein resolving the advertisement placement information comprises translating traffic and billing system identifiers into asset identifiers and uniform resource locators used for adaptive bitrate delivery of the content;
retrieving an advertisement manifest;
generating a channel manifest with spliced advertisements; and
outputting the channel manifest with spliced advertisements to the device.

12. The method of claim 11, wherein the advertisement placement information comprises one or more advertisement spot identifiers, and wherein the one or more advertisement spot identifiers are resolved to URL.

13. The method of claim 11, wherein the location information associated with the device comprises a network identifier, a zone identifier, region attributes, or profile attributes.

14. The method of claim 11, wherein the advertisement manifest is selected and retrieved based upon the location information associated with the device.

15. The method of claim 11, wherein the advertisement manifest is selected and retrieved based upon tune in/out information.

* * * * *